(12) United States Patent
Hayashida et al.

(10) Patent No.: US 7,399,530 B2
(45) Date of Patent: Jul. 15, 2008

(54) OBJECT WITH COMPOSITE HARD COATING LAYER AND METHOD OF FORMING COMPOSITE HARD COATING LAYER

(75) Inventors: Naoki Hayashida, Tokyo (JP); Kenji Yoneyama, Tokyo (JP); Kazushi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/504,150

(22) PCT Filed: Jun. 23, 2003

(86) PCT No.: PCT/JP03/07943

§ 371 (c)(1),
(2), (4) Date: Aug. 20, 2004

(87) PCT Pub. No.: WO2004/002735

PCT Pub. Date: Jan. 8, 2004

(65) Prior Publication Data

US 2005/0123741 A1    Jun. 9, 2005

(30) Foreign Application Priority Data

Jun. 27, 2002   (JP) .............................. 2002-188620

(51) Int. Cl.
*B32B 7/04*    (2006.01)
*B32B 27/08*   (2006.01)
*G11B 5/66*    (2006.01)
*C08F 2/46*    (2006.01)

(52) U.S. Cl. ...................... 428/516; 428/420; 428/520; 428/694 AH; 427/487

(58) Field of Classification Search ........... 428/694 AH, 428/516, 520, 420; 427/487
See application file for complete search history.

(56) References Cited

U.S. PATENT DOCUMENTS 4,404,247 A * 9/1983 Dominguez-Burguette et al. .......................... 428/213

(Continued)

FOREIGN PATENT DOCUMENTS

CN        1156164 A       8/1997

(Continued)

OTHER PUBLICATIONS

U.S. Appl. No. 10/505,020, filed Aug. 18, 2004, Hayashida, et al.

(Continued)

*Primary Examiner*—Kevin R. Kruer
(74) *Attorney, Agent, or Firm*—Oblon, Spivak, McClelland, Maier & Neustadt, P.C.

(57) ABSTRACT

The present invention provides inexpensively an article with a hard coat excellent in anti-staining property, lubricity, scratch resistance and abrasion resistance. The present invention also provides a method for forming the hard coat. A hard coat agent composition comprising an active energy ray-curable compound is applied onto a surface of an article (1) to be hard-coat-treated, thereby forming a hard coat agent composition layer, a surface material layer is formed by film-forming with a surface material comprising a fluorine-containing polyfunctional (meth)acrylate compound on the surface of the hard coat agent composition layer, and active energy rays are irradiated onto the formed hard coat agent composition layer and surface material layer so as to cure the both layers simultaneously, thereby forming a hard coat layer (2) contacting the surface of the article (1) and an anti-staining surface layer (3) contacting the surface of the hard coat layer (2).

7 Claims, 1 Drawing Sheet

U.S. PATENT DOCUMENTS

| | | | |
|---|---|---|---|
| 4,526,833 A * | 7/1985 | Burguette et al. | 428/336 |
| 4,681,925 A * | 7/1987 | Strepparola et al. | 526/246 |
| 4,880,687 A * | 11/1989 | Yokoyama et al. | 428/141 |
| 4,992,316 A * | 2/1991 | Ogawa | 428/65.5 |
| 5,178,954 A * | 1/1993 | Norman et al. | 428/422 |
| 5,279,877 A * | 1/1994 | Uchiyama et al. | 428/64.3 |
| 5,409,738 A * | 4/1995 | Matsunuma et al. | 427/502 |
| 5,534,322 A * | 7/1996 | Ueyama et al. | 428/64.2 |
| 5,580,633 A * | 12/1996 | Kuwahara et al. | 428/825.1 |
| 5,912,061 A * | 6/1999 | Uchida et al. | 428/64.3 |
| 6,150,001 A * | 11/2000 | Hedrick et al. | 428/65.4 |
| 6,238,798 B1 * | 5/2001 | Kang et al. | 428/421 |
| 6,346,309 B1 * | 2/2002 | Daimon | 428/64.1 |
| 6,617,011 B2 * | 9/2003 | Wu et al. | 428/216 |
| 7,026,030 B2 * | 4/2006 | Itoh et al. | 428/64.1 |
| 2003/0017368 A1 * | 1/2003 | Wu et al. | 428/694 TF |

FOREIGN PATENT DOCUMENTS

| | | |
|---|---|---|
| JP | 63-77574 | 4/1988 |
| JP | 1-182306 | 7/1989 |
| JP | 01-210080 | 8/1989 |
| JP | 4-7065 | 1/1992 |
| JP | 6-211945 | 8/1994 |
| JP | 7-92305 | 4/1995 |
| JP | 7-126552 | 5/1995 |
| JP | 8-48935 | 2/1996 |
| JP | 9-100111 | 4/1997 |
| JP | 9-137117 | 5/1997 |
| JP | 10-7950 | 1/1998 |
| JP | 10-33321 | 2/1998 |
| JP | 11-333370 | 12/1999 |
| JP | 2000-109828 | 4/2000 |
| JP | 2000-144011 | 5/2000 |
| JP | 2000-301053 | 10/2000 |
| JP | 2002-6102 | 1/2002 |
| JP | 2002-006102 | 1/2002 |
| JP | 2002-60526 | 2/2002 |
| JP | 2002-156504 | 5/2002 |

OTHER PUBLICATIONS

U.S. Appl. No. 10/504,150, filed Aug. 20, 2004, Hayashida, et al.
U.S. Appl. No. 10/499,648, filed Jun. 28, 2004, Hayashida, et al.
U.S. Appl. No. 10/503,130, filed Aug. 10, 2004, Hayashida, et al.
U.S. Appl. No. 10/507,216, filed Sep. 16, 2004, Hayashida, et al.
U.S. Appl. No. 10/504,150, filed Aug. 20, 2004, Hayashida, et al.

* cited by examiner

OBJECT WITH COMPOSITE HARD COATING LAYER AND METHOD OF FORMING COMPOSITE HARD COATING LAYER

The present application is a national stage of PCT/JP2003/07943, filed Jun. 23, 2003, which claims priority to Japanese application No. 2002-188620, filed Jun. 27, 2002.

TECHNICAL FIELD

The present invention relates to an article with a composite hard coat layer, and a method for forming a composite hard coat layer. In the present invention, a composite hard coat layer includes a hard coat layer which is formed on a surface of an article and has scratch resistance and a brasion resistance, and an anti-staining surface layer which is formed on the surface of the hard coat layer and has anti-staining property and lubricity. More specifically, the present invention-relates to an article having, on a surface thereof, a composite hard coat layer having anti-staining property, lubricity, scratch resistance and abrasion resistance in the field of various articles for which these properties are required, and a method for forming the composite hard coat layer.

In particular, the present invention concerns a method for forming a composite hard coat layer having anti-staining property, lubricity, scratch resistance and abrasion resistance on a surface of an optical recording medium, a magneto-optical recording medium, an optical lens, an optical filter, an anti-reflection film, or any one of various display elements such as a liquid crystal display, a CRT display, a plasma display and an EL display, without deteriorating these optical property and recording property, and also concerns an article on which the hard coat layer is formed.

BACKGROUND ART

Usually, a protective layer (hard coat layer) is given to the surface of various articles for which scratch resistance and abrasion resistance are required, for example, optical recording media such as a CD (Compact Disk) and a DVD (Digital Versatile Disk), a magneto-optical recording medium, an optical lens, an optical filter, an anti-reflection film, and various display elements such as a liquid crystal display, a CRT display, a plasma display and an EL display.

In many cases, stains such as a fingerprint, sebum, sweat and cosmetics are adhered to the surface of these articles by user's use of the articles. Once such stains are adheres thereto, they are not easily removed. This is a serious problem, in particular, for optical recording media or optical lenses used to record or reproduce the media since the recording and reproducing of information signals are remarkably obstructed by the adhered stains.

In magneto-optical recording media, a magnetic head runs on an organic protective layer formed on their recording layer. Accordingly, it is required that the abrasion resistance of the protective layer is made high and, simultaneously, the frictional coefficient thereof is made low.

As the method for solving the former problem, suggested are various methods of forming, on the surface of an optical lens or the like, a layer having a nature that stains do not adhere easily to the layer and even if stains adhere to the layer, the stains are easily wiped off, that is, a layer having anti-staining property. Specifically, the following method is adopted in many cases: a method of forming a layer made of a fluorine-based compound or a silicone-based compound on the surface to give water repellency and oil repellency to the surface, thereby improving the anti-staining property.

About the method for overcoming the latter problem, that is, the method for decreasing the frictional coefficient of the surface of a protective layer (hard coat layer), many measures have been suggested so far. Specifically, the following method is used in many cases: a method of forming, on the surface of the protective layer, a film made of a liquid lubricant such as a fluorine-based polymer (for example, perfluoropolyether) or a silicone-based polymer (for example, polydimethylsiloxane), thereby improving lubricity.

Originally, the former anti-staining property and the latter lubricity are entirely different properties. However, it is common to the two that a fluorine-based compound or a silicone-based compound is used as means for giving each of these properties in many cases. Accordingly, problems common to the two are frequently caused when a fluorine-based compound or a silicone-based compound is used to give anti-staining property or lubricity to the surface of a hard coat.

Many fluorine-based compounds or silicone-based compounds are soft. Thus, when these compounds are used, it is very difficult to obtain a sufficient abrasion resistance. In order to overcome such a problem, the following method can be considered: a method of adding an inorganic filler made of $SiO_2$ fine particles or the like to a fluorine-based polymer or silicone-based polymer matrix to make the abrasion resistance high. However, a little improvement is made but a satisfactory abrasion resistance cannot be obtained as far as the fluorine-based polymer or silicone-based polymer is used as the matrix, wherein the inorganic filler is dispersed.

Therefore, the following method is considered: a method of making a protective layer into a lamination structure composed of two or more different layers, making the lower layer into a layer made of a highly hard material, and forming an upper layer made of a fluorine-based compound or silicone-based compound on the surface thereof, thereby giving anti-staining property or lubricity. In this case, it is preferable to make the upper layer, which is made of the fluorine-based compound or silicone-based compound, as thin as possible so as to reflect the hardness of the lower layer in the upper layer, which constitutes the topmost surface of the lamination protective layer. However, in this method, it is very difficult to obtain close adhesion between the lower layer and the upper layer which is made of the fluorine-based compound or silicone-based compound.

As the method for solving the above-mentioned problem about the adhesion, for example, the following method is known: a method of forming a lower layer made of an inorganic material such as $SiO_2$ by such a process as sputtering or sol-gel process; forming, on the surface of the lower layer, an upper layer made of alkoxysilane having fluoroalkyl group by such a process as vapor deposition or solution application; subjecting the resultant to heat treatment in the presence of a very small amount of water content so as to cause dehydration condensation between silanol groups generated by hydrolysis of the alkoxysilane and/or between the silanol groups and hydroxyl groups present in the surface of the lower layer made of $SiO_2$ or the like, whereby the upper layer is fixed onto the lower layer surface through chemical bonds and/or hydrogen bonds.

In this method, it is desired that the lower layer surface has active groups such as hydroxyl groups at a high density. Therefore, the material that can be used in the lower layer is limited to an inorganic compound, in particular, a metal oxide or a metal chalcogenide such as $SiO_2$, $Al_2O_3$, $TiO_2$ or $ZnS$. Even when the lower layer is made of a metal oxide such as $SiO_2$, in order to make adhesion between this metal oxide and the alkoxysilane of the upper layer sufficient, it is necessary to subject the lower layer surface to activating treatment, such as alkali treatment, plasma treatment or corona discharge treatment, for increasing the density of active groups on the surface before the formation of the upper layer.

An attempt is also made for using a lower layer made of an organic material such as polyethylene, polycarbonate or polymethyl methacrylate; making the surface of the lower layer hydrophilic by such a method as plasma treatment or corona discharge treatment; and forming an upper layer made of the same alkoxysilane as described above on the surface of the lower layer. In this case, however, the adhesion is far poorer than in the case that the above-mentioned inorganic material is used as the lower layer. Thus, a sufficient durability is not obtained.

In the case that a substrate to be hard-coat-treated is made of resin, according to the above-mentioned method in which an inorganic material such as $SiO_2$ is used as the lower layer, it is very difficult to obtain the abrasion resistance of the hard coat. When the layer made of the inorganic material such as $SiO_2$ is formed on the surface of the resin substrate, the thickness of the film which can be formed is at most about several hundred nanometers. It is difficult from the standpoint of the production process thereof to make the film thickness larger than such a value. Even if such a film can be formed, the inorganic film self-breaks easily since a difference in elastic modulus or thermal expansion coefficient between the inorganic film and the substrate is remarkably large. It is however difficult that the inorganic film having a thickness of several hundred nanometers gives a sufficient abrasion resistance. It is also difficult to obtain a sufficient adhesion between the resin substrate and the inorganic film. Consequently, the inorganic film is easily peeled. From this viewpoint, it is difficult to obtain a sufficient abrasion resistance, as well.

Therefore, in the case that the substrate to be hard-coat-treated is made of resin, it is necessary to form a primer layer having a high elastic modulus on the resin substrate, form a lower layer made of the same inorganic film as described above on the primer layer, thereby keeping the adhesion between the resin substrate and the inorganic film and the strength of the inorganic film, subject the surface of the lower layer to activating treatment, and form an upper layer made of the same fluorine-based alkoxysilane as described above on the lower layer surface. Since it is necessary to form the three layers successively in this way, the productivity is very poor.

Japanese Laid-open Patent Publication No. 9-137117 (1997) discloses a method of applying, onto a surface of a resin substrate, a composition comprising a polymerizable compound having in the molecule thereof at least two (meth) acryloyloxy groups and inorganic compound fine particles such as silica fine particles; photo-polymerizing and curing the polymerizable compound by irradiation of active energy rays; subjecting the surface of this cured film to corona treatment or plasma treatment; and then applying, onto the treated surface, a silane compound having in the molecule thereof at least one group which can generate silanol group by hydrolysis, thereby forming a silane compound coat having an improved adhesion to the above-mentioned cured film. In this case, in order to keep the adhesion between the silane compound coat as the upper layer and the cured film as the lower layer, it is likewise necessary to subject the cured film surface to corona treatment or plasma treatment.

In the case that about a protective layer of the above-mentioned magneto-optical recording medium a liquid lubricant such as perfluoropolyether or polydimethylsiloxane is applied onto the surface of an organic protective layer to form a lubricant film, the adhesion between the organic protective layer and the liquid lubricant film may not be considered very much since the lubricant is a viscous liquid. However, there is a possibility in that the lubricant is decreased by sliding a magnetic field modulating head repeatedly for a long term or the lubricant volatilizes little by little in storage of the recording medium over a long term. In this method, therefore, it is desirable that the lubricant is firmly fixed on the organic protective layer surface.

Meanwhile, in order to obtain anti-staining property, it is necessary to give water repellency or oil repellency to the surface of a protective layer, as described above. However, this manner is not necessarily sufficient. The operation of wiping off adhering stains is generally carried out by users. Therefore, in order that users can feel that the operation of wiping off stains is easy at the time of carrying out this operation, it is necessary to decrease the frictional coefficient of the protective layer surface. Relationship between the anti-staining property of an article and the frictional coefficient thereof has hardly been pointed out so far. In reality, however, in order to give anti-staining property, it is essential to make the frictional coefficient low as well as give water repellency and oil repellency.

By making the frictional coefficient of the surface low, an impact caused when a hard projection contacts the surface can be slipped away; therefore, the generation of scratches can be suppressed. Accordingly, from the standpoint of improving the scratch resistance of the hard coat, it is required to make the frictional coefficient of the surface low, as well.

Japanese Laid-open Patent Publication Nos. 6-211945 (1994) and 2000-301053 disclose the formation of a hard coat layer by: applying, onto a substrate, a composition wherein fluoroalkyl acrylate and an acrylic monomer incompatible with this are dissolved at a given ratio in a solvent capable of dissolving the two; and irradiating electron rays onto the composition immediately after the application so as to cure the composition. According to these publications, by the application of the composition into a thickness of 1 to 15 μm and the irradiation of the electron rays immediately after the application, the solvent is instantaneously vaporized. Additionally, the fluoroalkyl acrylate compound and the acrylic monomer are localized so that the composition is cured in the state that the fluoroalkyl acrylate is distributed unevenly in the surface of the coat.

However, according to the two publications, it is necessary to irradiate the electron rays onto the composition so as to cure the composition instantaneously after the application of the composition and before the uneven distribution based on the volatilization of the solvent because the composition containing the components incompatible with each other is used. Accordingly, the timing of irradiating the electron rays after the application is difficult and the method for the application is restricted very much. Coating methods in which the evaporation rate of the solvent is large, for example, spin coating cannot be used.

A most serious problem in the methods disclosed in the publications is that there is a high possibility in that since the solvent is vaporized at the same time when the electron rays are irradiated, the solvent in the cured coat cannot be completely removed. In the publications, it is not at all examined whether the solvent is completely removed from the cured coat or not. In the case that a very small amount of the solvent remains inside, no problem is caused immediately after the formation of the hard coat but there is a possibility in that the coat is cracked or peeled after the use of the article with the coat over a long term. The hardness also becomes insufficient. Thus, a warp of the substrate on which the hard coat is formed is apt to increase gradually.

In the method of vaporizing the solvent at the same time when the electron rays are irradiated, the cured coat is apt to have a porous structure. Thus, the hardness thereof is insufficient and, further, the optical property may deteriorate. Accordingly, even if no problem is caused in the case of applying this method to the production of familiar articles, it is difficult to apply the method to the production of articles for which a very high optical property is required, for example, an optical lens or an optical recording medium.

In short, a hard coat wherein anti-staining property, lubricity and abrasion resistance are simultaneously realized at high levels has never been known so far.

DISCLOSURE OF THE INVENTION

Objects of the Invention

An object of the present invention is to solve the above-mentioned problems in the related art and provide inexpensively an article with a hard coat excellent in anti-staining property, lubricity, scratch resistance and abrasion resistance. An object of the present invention is also to provide a method for forming a hard coat excellent in anti-staining property, lubricity, scratch resistance and abrasion resistance inexpensively and easily.

SUMMARY OF THE INVENTION

The present inventors made eager investigation. As a result, the present inventors have found out that a hard coat layer having scratch resistance and abrasion resistance is cured/made on a surface of an article, and an anti-staining surface layer having anti-staining property and lubricity is cured/made on the surface of the hard coat layer simultaneously by irradiating active energy trays onto the both layers, thereby forming a composite hard coat layer in which the anti-staining surface layer and the hard coat layer are firmly adhered to each other. Thus, the present invention has-been made.

The present invention is an article with a composite hard coat layer comprising a hard coat layer on a surface of the article and an anti-staining surface layer on a surface of the hard coat layer, wherein the hard coat layer is made of a cured product of a hard coat agent composition comprising an active energy ray-curable compound, the anti-staining surface layer is made of a cured product of a surface material comprising a fluorine-containing polyfunctional (meth)acrylate compound, and the anti-staining surface layer is fixed on the hard coat layer.

The present invention is the above-described article with the composite hard coat layer wherein the anti-staining surface layer has a thickness of 1 nm or more and 100 nm or less.

The present invention is the above-described article with the composite hard coat layer wherein the active energy ray-curable compound comprised in the hard coat agent composition is a compound having at least one reactive group selected from the group consisting of (meth)acryloyl group, vinyl group and mercapto group.

The present invention is the above-described article with the composite hard coat layer wherein the hard coat agent composition comprises a photopolymerization initiator, and comprises an inorganic filler if necessary.

The present invention is a method for forming a composite hard coat layer comprising a hard coat layer and an anti-staining surface layer on a surface of an article, the method characterized in the steps of;

applying a hard coat agent composition comprising an active energy ray-curable compound onto a surface of an article to be hard-coat-treated, thereby forming a hard coat agent composition layer, film-forming, on a surface of the hard coat agent composition layer, with a surface material comprising a fluorine-containing polyfunctional (meth)acrylate compound, thereby forming a surface material layer, and irradiating active energy rays onto the formed hard coat agent composition layer and surface material layer so as to cure the both layers simultaneously, thereby forming a hard coat layer contacting the surface of the article and an anti-staining surface layer contacting the surface of the hard coat layer.

The present invention is the above-described method for forming the composite hard coat layer wherein the anti-staining surface layer is formed to have a thickness of 1 nm or more and 100 nm or less.

The present invention is the above-described method for forming the composite hard coat layer wherein after the hard coat agent composition is applied onto the surface of the article, the hard coat agent composition layer is dried to remove a solvent contained in the hard coat agent composition from the hard coat agent composition layer, and then the surface material layer is formed.

The present invention is the above-described method for forming the composite hard coat layer wherein after the hard coat agent composition is applied onto the surface of the article, the hard coat agent composition layer is dried if necessary, active energy rays are irradiated onto the hard coat agent composition layer to turn the composition layer into a half-cured state, and then the surface material layer is formed.

The present invention is the above-described method for forming the composite hard coat layer wherein the surface material layer is formed by film-forming with the surface material by applying or depositing.

The present invention is the above-described method for forming the composite hard coat layer wherein at the time of film-forming by applying the surface material to form surface material layer, there is used, as a solvent, a solvent in which the active energy ray-curable compound in the already-formed hard coat agent composition layer is not substantially dissolved.

The present invention is the above-described method for forming the composite hard coat layer wherein the active energy ray-curable compound comprised in the hard coat agent composition is a compound having at least one reactive group selected from the group consisting of (meth)acryloyl group, vinyl group and mercapto group.

The present invention is the above-described method for forming the composite hard coat layer wherein the active energy rays are electron rays or ultraviolet rays.

The present invention is the above-described method for forming the composite hard coat layer wherein the active energy rays are irradiated in an atmosphere having an oxygen concentration of 500 ppm or less.

The present invention is an article with a composite hard coat layer comprising a hard coat layer on a surface of the article and an anti-staining surface layer on a surface of the hard coat layer, wherein the article is obtained by applying a hard coat agent composition comprising an active energy ray-curable compound onto a surface of an article to be hard-coat-treated, thereby forming a hard coat agent composition layer, film-forming, on a surface of the hard coat agent composition layer, with a surface material comprising a fluorine-containing polyfunctional (meth)acrylate compound, thereby forming a surface material layer, and irradiating active energy rays onto the formed hard coat agent composition layer and surface material layer so as to cure the both layers simultaneously, thereby forming a hard coat layer contacting the surface of the article and an anti-staining surface layer contacting the surface of the hard coat layer.

In the present invention, the article is, for example, an optical recording medium, a magneto-optical recording medium, an optical lens, an optical filter, an anti-reflection film, or any one of various display elements. Examples of the display element include a liquid crystal display, a CRT display, a plasma display and an EL display.

In the description, the wording "a hard coat agent composition layer" means a hard coat layer which has not been cured or has been half-cured (i.e., has been partially cured). The wording "a surface material layer" means a surface layer which has not-been cured, namely an anti-staining surface layer.

MODES FOR CARRYING OUT THE INVENTION

Figure 1:
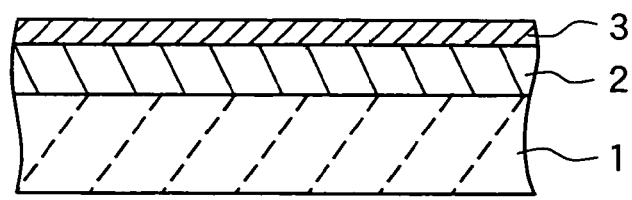
FIG. 1 is a sectional view which schematically illustrates an example of the layer structure of the article with a composite hard coat layer of the present invention.

The following describes the embodiment of the present invention in detail with reference to FIG. 1.

FIG. 1 is a sectional view which schematically illustrates an example of the layer structure of the article with a composite hard coat layer of the present invention. In FIG. 1, a hard coat layer (2) is formed on a surface of an article (1) to be hard-coat-treated, and an anti-staining surface layer (3) is formed to contact the surface of the hard coat layer (2). The combination of the hard coat layer (2) and the anti-staining surface layer (3) is referred to as the composite hard coat layer for the sake of convenience.

Examples of the article (1) include various objects for which hard coat treatment is necessary. Specific examples thereof include sheets or substrates made of a thermoplastic resin such as polyethylene terephthalate (PET), polymethyl methacrylate, polyethylene, polypropylene and polycarbonate. However, the article (1) is not limited to these examples. More specific examples of the article include an optical recording medium, a magneto-optical recording medium, an optical lens, an optical filter, an anti-reflection film, and various display elements such as a liquid crystal display, a CRT display, a plasma display and an EL display.

First, a hard coat agent composition containing an active energy ray-curable compound is applied onto a surface of the article (1) so as to form a hard coat agent composition layer. Next, a surface material layer is formed by film-forming with a surface material (i.e., the material having anti-staining property and lubricating property) comprising a fluorine-containing polyfunctional (meth)acrylate compound on the surface of the hard coat agent composition layer. The following describes respective components of the hard coat agent composition and the surface material.

The active energy ray-curable compound contained in the hard coat agent composition is any compound having at least one reactive group selected from (meth)acryloyl group, vinyl group and mercapto group. The structure of this compound is not particularly limited. The active energy ray-curable compound preferably contains a polyfunctional monomer or oligomer containing, in the single molecule thereof, 2 or more, preferably 3 or more polymerizable groups in order to give a sufficient hardness to a hard coat. The active energy ray-curable compound may contain a monofunctional monomer.

Among such active energy ray polymerizable compounds, examples of the compound having (meth)acryloyl group include 1,6-hexanediol di(meth)acrylate, triethylene glycol di(meth)acrylate, ethylene oxide-modified bisphenol A di(meth)acrylate, trimethylolpropane tri(meth)acrylate, pentaerythritol tetra(meth)acrylate, ditrimethylolpropane tetra (meth)acrylate, dipentaerythritol hexa(meth)acrylate, pentaerythritol tri(meth)acrylate, 3-(meth)acryloyloxyglycerin mono(meth)acrylate, urethane acrylate, epoxy acrylate, and ester acrylate. However, the compound having (meth)acryloyl group is not limited to these examples.

Examples of the compound having vinyl group include ethylene glycol divinyl ether, pentaerythritol divinyl ether, 1,6-hexanediol divinyl ether, trimethylolpropane divinyl ether, ethylene oxide-modified hydroquinone divinyl ether, ethylene oxide-modified bisphenol A divinyl ether, pentaerythritol trivinyl ether, dipentaerythritol hexavinyl ether, and ditrimethylolpropane polyvinyl ether. However, the compound having vinyl group is not limited to these examples.

Examples of the compound having mercapto group include ethylene glycol bis(thioglycolate), ethylene glycol bis(3-mercaptopropionate), trimethylolpropane tris(thioglycolate), trimethylolpropane tris(3-mercaptopropionate), pentaerythritol tetrakis(mercaptoacetate), pentaerythritol tetrakis (thioglycolate), and pentaerythritol tetrakis(3-mercaptopropionate). However, the compound having mercapto group is not limited to these examples.

The active energy ray-curable compounds contained in the hard coat agent composition may be used alone or in combination of two or more thereof.

The hard coat agent composition may contain a known photopolymerization initiator. The photopolymerization initiator is not particularly necessary when electron rays are used as the active energy rays. However, when ultraviolet rays are used, the initiator is necessary. Examples of a radical photo initiator, among the photopolymerization initiators, include DAROCURE 1173, IRGACURE 651, IRGACURE 184, and IRGACURE 907 (all of which are products manufactured by Ciba Specialty Chemicals Inc.). The content by percentage of the photopolymerization initiator is, for example, from about 0.5 to 5% by weight of the hard coat agent composition (as a solid content).

When necessary, the hard coat agent composition may contain an inorganic filler in order to improve abrasion resistance. Examples of the inorganic fillers include silica, alumina, zirconia, and titania. The inorganic filler has a particle size of, for example, about 5 to 50 nm. Preferably, the surface of the inorganic filler is modified with a compound having an active energy ray polymerizable group. Once polymerized, the filler is fixed in the polymer matrix. One example of such inorganic fillers is reactive silica particles described in Japanese Laid-Open Patent Publication No. 9-100111(1997). Such particles are suitable for use in the present invention. The use of such an inorganic filler in the hard coat agent composition can further improve the abrasion resistance of the hard coat layer. The amount of the inorganic filler in the hard coat agent composition (as solid component) is for example from about 5 to 80% by weight. If the amount of the inorganic filler is in excess of 80% by weight, the film strength of the hard coat layer tends to be decreased.

When necessary, the hard coat agent composition may further contain a non-polymerizable diluent, a photopolymerization co-initiator, an organic filler, a polymerization inhibitor, an antioxidant, an ultraviolet ray absorber, a photo-stabilizer, an antifoamer, a leveling agent, a pigment, and a silicon compound and others.

The surface material comprises a fluorine-containing polyfunctional (meth)acrylate compound. This compound is an active energy ray polymerizable compound. The cured product of this compound exhibits anti-staining property and lubricating property and can thus impart water repellency and/or lubricity to the surface of articles. In the case that a fluorite-containing polyfunctional (meth)acrylate compound is used as the surface material, the adhesion to the hard coat layer is increased more than in the case that a fluorine-containing monofunctional (meth) acrylate compound is used as the surface material. As a result, the composite hard coat layer having higher durability can be obtained. In the present invention, the surface material does not comprise any fluorine-containing monofunctional (meth)acrylate compound.

Examples of the fluorine-containing polyfunctional (meth)acrylate compounds include straight-chained perfluoroalkylene di(meth)acrylates, perfluoropolyether di(meth)acrylates, perfluoropolyether tri(meth)acrylates, and perfluoropolyether tetra(meth)acrylates.

Examples of the straight-chained perfluoroalkylene di(meth)acrylates include di(meth)acrylates that include perfluoroalkylene group having 12 or fewer carbon atoms, preferably 8 or more and 12 or fewer carbon atoms, and are represented by the following general formula:

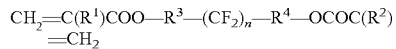

wherein $R^1$ and $R^2$ each independently represent H or methyl group; $R^3$ and $R^4$ each independently represent a lower alkylene group; and n is an integer from 1 to 12. Examples of the lower alkylene group for $R^3$ and $R^4$ include $-CH_2-$, $-CH_2CH_2-$, and ($(CF_2)_n$ group side)-$CH_2OCH_2-CH(OH)CH_2$-(acryl group side).

Specific examples of the straight-chained perfluoroalkylene di(meth)acrylates include, but are not limited to, 1H,1H,6H,6H-perfluoro-1,6-hexanediol di(meth)acrylate, 1H,1H,10H,10H-perfluoro-1,10-decanediol di(meth)acrylate, and 1H,1H,10H,10H-perfluoro-1,10-decanediol diepoxy(meth)acrylate.

Examples of the perfluoropolyether di(meth)acrylates include di(meth)acrylates or diepoxy(meth)acrylates obtained from diol-modified perfluoropolyethers. Specific examples include di(meth)acrylates or diepoxy(meth)acrylates synthesized by using the following diol-modified perfluoropolyethers as the diol component. Perfluoropolyether di(meth)acrylate is preferably a compound with a molecular weight of 1000 or more, more preferably a compound with a molecular weight of 1500 to 2500, in order to exhibit sufficient water repellency and oil repellency.

(Ausimont Co., Fomblin Z DOL, molecular weight: about 2,000) and

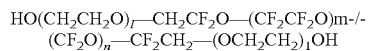

(Ausimont Co., Fomblin Z DOL TX2000, molecular weight: about 2,200)
(l,m, and n each indicate the degree of polymerization).

Examples of the perfluoropolyether tetra(meth)acrylates include tetra(meth)acrylates or tetraepoxy(meth)acrylates obtained from tetraol-modified perfluoropolyethers. Specific examples are tetra(meth)acrylates or tetraepoxy(meth)acrylates synthesized by using the following tetraol-modified perfluoropolyethers as the tetraol component:

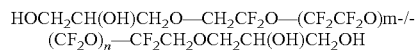

(Ausimont Co., Fomblin Z TETRAOL)
(m and n each indicate the degree of polymerization).

These fluorine-containing polyfunctional (meth)acrylate compounds may be used alone or in combination of two or more thereof.

In the case that a fluorine-containing polyfunctional (meth)acrylate compound is used as the surface material, the adhesion to the hard coat layer is increased more than in the case that a fluorine-containing monofunctional (meth)acrylate compound is used as the surface material. However, the surface smoothness of the anti-staining surface layer may be slightly lower. In such a case, a high surface smoothness can be achieved by adjusting the concentration of the-fluorine-containing polyfunctional (meth)acrylate in the surface material solution to for example about 0.75% by weight or less, and preferably about 0.1 to 0.5% by weight.

As with the hard coat agent composition, the surface material may contain, when necessary, a non-polymerizable diluent, a photopolymerization initiator, a photopolymerization co-initiator, an organic filler, an inorganic filler, a polymerization inhibitor, an antioxidant, an ultraviolet ray absorber, a photo-stabilizer, an antifoamer, a leveling agent, a pigment, and a silicon compound and others. However, the material selected must be such that it can form a 1 nm or more and 100 nm or less thick ultra-thin film to serve as the anti-staining surface layer.

In the present invention, the above-mentioned hard coat agent composition is first applied onto the surface of the article (1) to form a hard coat agent composition layer. The coating method for the application is not limited, and may be any one of various coating methods such as spin coating, dip coating and gravure coating methods.

After the hard coat agent composition is applied onto the surface of the article (1) and before the film is formed with the surface material, it is preferable to remove the fluidity of the hard coat agent composition layer. The removal of the fluidity of the hard coat agent composition layer-makes it possible to prevent a variation in the thickness of the hard coat agent composition layer or a deterioration in the surface smoothness thereof when the film is formed with the surface material on this composition layer. In this way, the surface material can easily be made into a uniform film.

To remove the fluidity of the hard coat agent composition layer, for example, it is advisable to dry, after the application of the composition, the applied layer so as to remove the solvent contained in the composition from the hard coat agent composition layer. It is also allowable to irradiate, after the application and optional drying of the applied layer, active energy rays such as ultraviolet rays onto the layer so as to turn the hard coatagent composition layer into a half-cured state. The word "half-cured" means that apart of the hard coat agent composition has not yet reacted. Accordingly, the physical hardness of the hard coat agent composition layer is not limited. Thus, the tackiness of the surface is allowed to be lost. To achieve such half-cured state, the amount of the active energy rays, such as ultraviolet rays, to be irradiated may be reduced. In this manner, the hard coat agent composition remains unreacted at least in the vicinity of the surface of the hard coat agent composition layer.

Next, a surface material layer is formed by film-forming with the above-mentioned surface material on the surface of the hard coat agent composition layer which has not been cured or which has been partially cured (i.e., which is in the half-cured state). It is advisable to form the surface material layer in such a manner that the thickness of an anti-staining surface layer finally obtained will be made into 1 nm or more and 100 nm or less, preferably 5 nm or more and 50 nm or less. If the thickness is less than 1 nm, effects of anti-staining property and lubricity are not sufficiently obtained. If the thickness exceeds 100 nm, the hardness of the underlying hard coat layer is not sufficiently reflected. Thus, effects of scratch resistance and abrasion resistance decrease.

The film-forming can be conducted by the application or the deposition of the surface material. The manner of the film-forming by application is described in the following. The surface material is applied by diluting the surface material with a suitable solvent and then applying the resultant coating solution by any one of various methods such as spin coating, dip coating, gravure coating, and spray coating methods.

It is preferred to use, as the solvent in this case, a solvent in which the active energy ray-curable compound in the hard coat agent composition layer which has not been cured or has been partially cured is not substantially dissolved. It depends on not only the kind of the solvent but also the coating method whether or not the hard coat agent composition layer is substantially dissolved. In many cases in which as the coating method of the surface material layer, for example, spin coating is used, almost all of the diluent contained in the coating solution volatilizes when the spin coating is performed. Therefore, even if a solvent in which the hard coat agent composition layer is dissolved to some degree is used as the diluent, no practical problems are caused. In the case that as the coating method of the surface material layer, for example, dip coating is used, the hard coat agent composition layer surface which has not been cured contacts the surface material layer coating solution for a long time. It is therefore necessary to use a solvent in which the hard coat agent composition layer material is not at all dissolved or is hardly dissolved.

In this way, the hard coat agent composition layer which has not been cured or has been partially cured (i.e., which is in the half-cured state) and the surface material layer which is positioned on the surface thereof and has not been cured are formed.

Next, the formed hard coat agent composition layer and surface material layer are irradiated with active energy rays so as to be simultaneously cured. At this time, the active energy rays having an energy amount sufficient to cure the both layers completely are irradiated to complete the curing reaction of the both layers. By curing, at the same time, the hard coat agent composition layer which has not been cured or has been partially cured and the surface material layer which is formed to contact the surface thereof and has not been cured, the both layers are firmly adhered to each other in the interface therebetween. That is, the cured anti-staining surface layer (3) adhered firmly onto the cured hard coat layer (2) is obtained.

By use of such a process of the present invention, it is possible to form, on the high-hardness hard coat layer (2), the anti-staining surface layer (3) which is so thin as to reflect the hardness thereof on the topmost surface and is good in water repellency and lubricity and, further, it is possible to obtain good adhesion between the hard coat layer (2) and the anti-staining surface layer (3).

As the means for curing the hard coat agent composition layer and the surface material layer simultaneously, suitable means selected from active energy rays such as ultraviolet rays, electron rays, and visible rays may be used. However, in the present invention, to set the thickness of the anti-staining surface layer into a very small value, such as a value of 1 nm or more and 100 nm or less, preferably 5 nm or more and 50 nm or less and obtain better adhesion of the surface layer to the hard coat layer, it is necessary to use the curing method capable of exhibiting the good reactivity near the interface of the both layers.

Specifically, if either electron rays or ultraviolet rays should be used as the active energy rays, it is preferable to conduct purging with inert gas such as nitrogen in such a manner that the oxygen concentration in the atmosphere for the active energy ray irradiation will be 500 ppm or less, preferably 200 ppm or less and more preferably 10 ppm or less. This is because the hindrance of the surface-curing, resulting from oxygen radicals generated in the irradiation atmosphere, is suppressed. Alternatively, known various oxygen-hindrance inhibitors may be added to the hard coat agent composition and/or the surface material instead of the control of the oxygen concentration in the irradiation atmosphere. Examples of such an oxygen-hindrance inhibitor include oxygen-hindrance inhibitors described in Japanese Laid-open Patent Publication Nos. 2000-109828, 2000-109828 and 2000-144011. Needless to say, it is allowable to use both of the oxygen-hindrance inhibitor and the control of the oxygen concentration in the irradiation atmosphere.

By use of such materials and such film-forming and film-curing methods, there is formed a composite hard coat layer which is excellent in abrasion resistance, water repellency and lubricity and is also good in persistence of these properties.

EXAMPLES

The present invention will be described more specifically by way of the following examples. However, the present invention is not limited to these examples.

Example 1

An ultraviolet ray-curable/electron ray-curable hard coat agent (DESOLITE Z7503, manufactured by JSR Corp.) was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. In this way, a hard coat layer which had not been cured was formed. The above-mentioned hard coat agent was a composition containing a reactive inorganic filler, disclosed in Japanese Laid-open Patent Publication No. 9-100111 (1997).

Next, a solution comprising 0.5% by mass of perfluoropolyether diacrylate (acryl-modified product of a Fomblin Z DOL manufactured by Ausimont Co., molecular weight: about 2,000) and 99.5% by mass of FLUORINERT FC-77 (manufactured by Sumitomo 3M Ltd.) was prepared. This surface material solution was applied onto the above-mentioned hard coat layer which had not been cured by spin coating. The resultant was dried at 60° C. for 3 minutes to form a surface layer which had not been cured.

Thereafter, electron rays were irradiated onto the surface layer under nitrogen flow, thereby curing the hard coat layer and the surface layer simultaneously. A CURETRON (manufactured by NHV Corp.) was used as an electron rays irradiating device, and the accelerating voltage of the electron rays and the irradiation dose thereof were set to 200 kV and 10 Mrad, respectively. The oxygen concentration in the irradiation atmosphere was 80 ppm. The thickness of the cured hard coat layer was 3.4 µm, and the thickness of the cured surface layer was about 36 nm. The thickness of the surface layer was measured by X-ray fluorescence analysis (XRF), using perfluoropolyether (DEMNUM, manufactured by Daikin Industries, Ltd.) as a standard material. In this way, the substrate with the composite hard coat layer was obtained.

Example 2

An ultraviolet ray-curable/electron ray-curable hard coat agent (DESOLITE Z7503, manufactured by JSR Corp.) was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. Thereafter, weak ultraviolet rays (a high-pressure mercury lamp, 80 mJ/cm$^2$) were irradiated in the atmosphere, a hard coat layer which had been half-cured was formed.

Next, a solution comprising 0.5% by mass of perfluoropolyether diacrylate (acryl-modified product of a Fomblin Z DOL manufactured by Ausimont Co., molecular weight: about 2,000) and 99.5% bymass of FLUORINERTFC-77 (manufactured by Sumitomo 3M Ltd.) was prepared. This surface material solution was applied onto the above-mentioned hard coat layer which had been half-cured by spin coating. The resultant was dried at 60° C. for 3 minutes to form a surface layer which had not been cured.

Thereafter, under the same electron ray irradiating condition as Example 1, electron rays were irradiated onto the surface layer under nitrogen flows thereby curing the hard coat layer and the surface layer simultaneously to obtain the substrate with the composite hard coat layer. The thickness of the cured hard coat layer was 3.4 µm, and the thickness of the cured surface layer was about 32 nm.

Example 3

A solution comprising 0.25% by mass of perfluoropolyether diacrylate (acryl-modified product of a Fomblin Z DOL manufactured by Ausimont Co., molecular weight: about 2,000) and 99.75% by mass of FLUORINERT FC-77 (manufactured by Sumitomo 3M Ltd.) was prepared. A substrate with a composite hard coat layer was obtained in the same way as in Example 1 except that this solution was used as surface material solution. The thickness of the cured hard coat layer was 3.4 µm, and the thickness of the cured surface layer was about 25 nm.

Example 4

A solution comprising 0.5% by mass of ART3 manufactured by Kyoeisha Chemical Co., LTD. (perfluoropolyether diacrylate, molecular weight: about 1,000) and 99.5% by mass of FLUORINERT FC-77 (manufactured by Sumitomo 3M Ltd.) was prepared. A substrate with a composite hard coat layer was obtained in the same way as in Example 1 except that this solution was used as surface material solution. The thickness of the cured hard coat layer was 3.4 µm, and the thickness of the cured surface layer was about 30 nm.

Comparative Example 1

An ultraviolet ray-curable/electron ray-curable hard coat agent (DESOLITE Z7503, manufactured by JSR Corp.) was applied onto a polycarbonate substrate (thickness: 0.6 mm, diameter: 12 cm) by spin coating. Thereafter, the resultant was heated at 60° C. in the atmosphere for 3 minutes, to remove the diluent in the coat. In this way, a hard coat layer which had not been cured was formed.

Next, a solution comprising 0.5% by mass of 2-(perfluorodecyl)ethyl acrylate (manufactured by Daikin Fine Chemical laboratory Co.) and 99.5% by mass of FLUORINERT FC-77 (manufactured by Sumitomo 3M Ltd.) was applied onto the above-mentioned hard coat layer which had not been cured by spin coating. The resultant was dried at 60° C. for 3 minutes to form a surface layer which had not been cured.

Thereafter, under the same electron ray irradiating condition as Example 1, electron rays were irradiated onto the surface layer under nitrogen flow, thereby curing the hard coat layer and the surface layer simultaneously to obtain the substrate with the composite hard coat layer. The thickness of the cured hard coat layer was 3.4 µm, and the thickness of the cured surface layer was about 36 nm.

Comparative Example 2

5 parts by weight of 2-(perfluorooctyl)ethyl acrylate (manufactured by Daikin Fine Chemical laboratory Co.) was added to 95 parts by weight of ultraviolet ray-curable/electron ray-curable hard coat agent (DESOLITE Z7503, manufactured by JSR Corp.) so as to prepare the uniform composition. This composition was applied onto a polycarbonate substrate (thickness: 0.6 mm, diameter: 12 cm) by spin coating. Thereafter, electron rays were immediately irradiated under nitrogen flow to cure the applied composition, thereby the substrate with the composite hard coat layer was obtained. Electron ray irradiating condition was the same as Example 1. The thickness of the cured hard coat layer was 4.0 µm.

(Evaluation)

About the respective specimens produced in Examples 1 to 4 and Comparative Examples 1 and 2, the following performance tests were made.

(1) Abrasion Resistance

A steel wool #0000 was used, and the wool was reciprocated 20 times so as to be slid onto the hard coat surface of each of the specimens under a load of 4.9 N/cm$^2$. The degree of injuries generated at this time was judged with the naked eye. The criterion for the judgment was as follows:

◯: No injuries were generated;
Δ: Injuries were slightly generated; and
X: Injuries were generated.

(2) Water Repellency and Persistence thereof

The contact angle of water to the hard coat surface of each specimen was measured. The measurement was made after the specimen was left at room temperature for one day from the production thereof (initial time), after the hard coat surface of the specimen left at room temperature for one day from the production thereof was slid with a cloth impregnated with a solvent, and after the hard coat surface of the specimen left at room temperature for 30 days from the production thereof was slid with a cloth impregnated with a solvent. Conditions for the sliding were as follows: a nonwoven cloth (Bemcot Lint-free CT-8, manufactured by Asahi Kasei Co., Ltd.) was impregnated with acetone, and the cloth was reciprocated 50 times to be slid on the specimen surface under a load of 4.9 N/cm$^2$. The contact angle was measured at a temperature of 20° C. and a relative humidity of 60%, using a contact angle meter CA-D manufactured by Kyowa Interface Science Co., Ltd.

(3) Surface Smoothness

The smoothness of the hard coat surface of each specimen was determined with the naked eye. The specimen surface was directed to an electric light source and was visually inspected at an oblique angle of 20 to 30 degrees to determine the uniformity of the surface layer (the presence or absence of microscopic aggregations) and the presence or absence of any concavity or convexity, or any corrugations that may be caused by the surface roughness of the hard coat layer. The ratings were made on the following scale:

TABLE 1

| | Abrasion resistance | Surface material solution | | The contact angle (degree) | | | Surface smoothness |
|---|---|---|---|---|---|---|---|
| | | The total concentration of fluorinated acrylates (% by weight) | The type of fluorinated acrylates | Initial After an elapse of one day | After sliding After an elapse of one day | After an elapse of 30 days | |
| Example 1 | ○ | 0.5 | Bifunctional | 105.7 | 106.2 | 106.0 | ○− |
| Example 2 | ○ | 0.5 | Bifunctional | 105.4 | 105.3 | 106.2 | ○+ |
| Example 3 | ○ | 0.25 | Bifunctional | 105.2 | 105.5 | 105.0 | ○+ |
| Example 4 | ○ | 0.5 | Bifunctional | 96.3 | 96.7 | 96.0 | ◎ |
| Comparative Example 1 | ○ | 0.5 | Monofunctional | 105.3 | 103.0 | 94.5 | ◎ |
| Comparative Example 2 | ○ | — | — | 67.0 | 65.7 | 65.5 | × |

◎: The surface layer contained no microscopic aggregation and was uniform, and no concavities or convexities, or corrugations were observed on the hard coat layer;
○+: Slight formation of the microscopic aggregations was observed on the surface layer, and no concavities of convexities, or corrugations were observed on the hard coat layer;
○−: The surface layer contained some microscopic aggregations, while no concavities or convexities, or corrugations were observed on the hard coat layer;
Δ: The surface layer contained signifigant microscopic aggregations, and some concavities or convexities, or corrugations were observed on the hard coat layer; and
×: The hard coat layer contained signifigant concavities or convexities, or corrugations and was opaque.

The results are shown in Table 1.

As can be seen from Table 1, each of the substrates of Examples 1 through 4 with respective hard coat layers had significantly high surface hardness, high water repellency, and high persistence thereof.

In Example 1, the surface smoothness of the substrate, though at a practical level, was slightly lower as compared to the substrates of the other Examples. In Example 2, in which the surface material was the same as the surface material used in Example 1, and the hard coat layer was half-cured prior to application of the surface material layer, the substrate had a high surface smoothness. In Example 3, in which the surface material was the same as the surface material used in Example 1, and the concentration of fluorinated acrylates in the surface material was low, the substrate had a high surface smoothness. In Example 4, perfluoropolyether diacrylate (molecular weight: about 1,000) with lower molecular weight as compared to perfluoropolyether diacrylate in Examples 1 to 3 was used, so that the substrate had a significantly high surface smoothness. However, this perfluoropolyether diacrylate had low molecular weight, accordingly the main chain thereof, which exhibit water repellency and oil repellency, was short. Consequently, water repellency of the substrate of Example 4 was slightly lower as compared to the substrates of Examples 1 to 3.

The substrate of Comparative Example 1 with a hard coat layer had a significantly high surface hardness, exhibited a good initial water repellency, and had a high surface smoothness. However, when the substrate was subjected to harsh test conditions in which the substrate was left at room temperature for 30 days and then was slid with a cloth impregnated with acetone, the contact angle was decreased. This is believed to be because the substrate was slid with a cloth impregnated with acetone to remove the anti-staining surface layer.

Although the same material as in Comparative Example 1 was used in Comparative Example 2, the substrate of Comparative Example 2 showed significantly low water repellency during initial testing, as did it after the sliding with cloth. Specifically, its intended purpose was not achieved because the fluorinated acrylate components were not exposed on the coating surface just by applying the fluorinated acrylate-added active energy ray-curable resin onto the substrate and then curing it. Furthermore, in Comparative Example 2, significant unevenness of coating was observed during application of the prepared composition to the surface of the substrate. This is thought to occur since the diluent evaporates during spin-coating, and the acryl monomer and the fluorinated acrylates, which are incompatible to one another, rapidly underwent phase separation. This also makes the composition impractical for use in the hard coat.

Example 5

This example was a production example of an optical information medium with a composite hard coat layer (abbreviated to the optical disk). In this example, the produced optical disk was of a phase-change type. The present invention can be applied to various disks regardless of the kind of their recording layer. Thus, the present invention can be applied to not only this disk but also a read-only type optical disk, a write-once type optical disk or some other disk.

Figure 2:
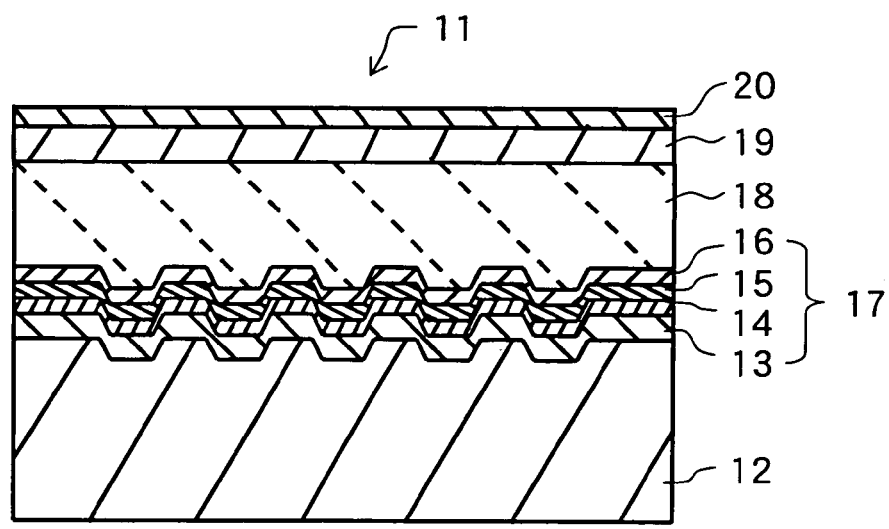
FIG. 2 is a schematic sectional view of an example of the optical disk with a composite hard coat layer of the present invention.

FIG. 2 is a schematic sectional view of an example of an optical disk with a composite hard coat layer. In FIG. 2, an optical disk (11) has, on a surface of a supporting substrate (12) in which fine concavities or convexities (such as information pits or pregrooves) are made, a reflecting layer (13), a second dielectric layer (14), a phase-change recording material layer (15), and a first dielectric layer (16) in this order. The disk (11) has a light-transmitting layer (18) on the first dielectric layer (16), and further has a hard coat layer (19) and an anti-staining surface layer (20) on the light-transmitting layer (18). In this example, the reflecting layer (13), the second dielectric layer (14), the phase-change recording material layer (15) and the first dielectric layer (16) constitute a recording layer (17). The combination of the hard coat layer (19) and the anti-staining surface layer (20) is referred to as the composite hard coat layer for the sake of convenience. The optical disk (11) is used in such a manner that a laser beam for recording or reproducing is introduced into the recording layer through the anti-staining surface layer (20), the hard coat layer (19) and the light-transmitting layer (18).

A sample of the optical disk having the layer structure illustrated in FIG. 2 was produced as follows.

The reflecting layer (13) made of $Al_{98}Pd_1Cu_1$ (atomic ratio) and having a thickness of 100 nm was formed on a surface of the disk-form supporting substrate (12) (made of polycarbonate, diameter: 120 mm, thickness: 1.1 mm), in which grooves for recording information were made, by sputtering. The depth of the grooves was $\lambda/6$ in an optical path length at wavelength $\lambda=405$ nm. The recording track pitch in a groove recording manner was set into 0.32 μm.

Next, an $Al_2O_3$ target was used to form the second dielectric layer (14) having a thickness of 20 nm on the surface of the reflecting layer (13) by sputtering. An alloy target made of a phase-change material was used to form the recording material layer (15) having a thickness of 12 nm on the surface of the second dielectric layer (14) by sputtering. The composition (atomic ratio) of the recording material layer (15) was set into $Sb_{74}Te_{18}(Ge_7In_1)$. A ZnS (80% by mole) —$SiO_2$ (20% by mole) target was used to form the first dielectric layer (16) having a thickness of 130 nm on the surface of the recording material layer (15) by sputtering.

Next, a radical-polymerizable ultraviolet ray-curable resin having the following composition was applied onto the surface of the first dielectric layer (16) by spin coating, and then ultraviolet rays were irradiated thereon so as to form the light-transmitting layer (18) in such a manner that the thickness thereof would be 98 μm after the layer (18) was cured.

| (Light-transmitting layer: Composition of ultraviolet ray-curable resin) | |
| --- | --- |
| urethane acrylate oligomer: (DIABEAM UK6035, manufactured by Mitsubishi Rayon Co., Ltd.) | 50 parts by weight |
| isocyanuric acid EO modified triacrylate: (ARONIX M315, manufactured by Toagosei Co., Ltd.) | 10 parts by weight |
| isocyanuric acid EO modified diacrylate: (ARONIX M215, manufactured by Toagosei Co., Ltd.) | 5 parts by weight |
| tetrahydrofurfuryl acrylate: | 25 parts by weight |
| photopolymerization initiator(1-hydroxycyclohexyl phenyl ketone): | 3 parts by weight |

Next, an ultraviolet ray-curable/electron ray-curable hard coat agent having the following composition was applied onto the light-transmitting layer (18) by spin coating, and then the resultant was heated at 60° C. in the atmosphere for 3 minutes to remove the diluent in the coat. Thereafter, weak ultraviolet rays (a high-pressure mercury lamp, 80 mJ/cm²) were irradiated in the atmosphere, the hard coat layer (19) which had been half-cured was formed.

| (Composition of hard coat agent) | |
| --- | --- |
| reactive group modified colloidal silica: (dispersing medium: propylene glycol monomethyl ether acetate, nonvolatile content: 40% by weight) | 100 parts by weight |
| dipentaerythritol hexaacrylate: | 48 parts by weight |
| tetrahydrofurfuryl acrylate: | 12 parts by weight |
| propylene glycol monomethyl ether acetate: (non-reactive diluent) | 40 parts by weight |
| IRGACURE 184 (polymerization initiator): | 5 parts by weight |

Next, a solution comprising 0.5% by mass of perfluoropolyether diacrylate (acryl-modified product of a Fomblin Z DOL manufactured by Ausimont Co., molecular weight: about 2,000) and 99.5% by mass of FLUORINERTFC-77 (manufactured by Sumitomo 3M Ltd.) was prepared. This surface material solution was applied onto the above-mentioned hard coat layer (19) which had been half-cured by spin coating. The resultant was dried at 60° C. for 3 minutes to form a surface layer (20) which had not been cured.

Thereafter, electron rays were irradiated onto the surface layer under nitrogen flow, thereby curing the hard coat layer (19) and the surface layer (20) simultaneously. A Min-EB (manufactured by USHIO Inc.) was used as an electron rays irradiating device, and the accelerating voltage of the electron rays and the irradiation dose thereof were set to 50 kV and 5 Mrad, respectively. The oxygen concentration in the irradiation atmosphere was 80 ppm. The thickness of the hard coat layer (19) was 2.5 μm, and the thickness of the surface layer (20) was about 28 nm. The thickness of the surface layer was measured by X-ray fluorescence analysis (XRF), using perfluoropolyether (DEMNUM, manufactured by Daikin Industries, Ltd.) as a standard material. In this way, the optical recording disk sample No.1 with the composite hard coat layer was obtained.

Comparative Example 3

In the same way as in Example 5, a reflecting layer (13), a second dielectric layer (14), a phase-change recording material layer (15), and a light-transmitting layer (18) were formed, in the order, on a surface of a disk-form supporting substrate (12).

Next, an ultraviolet ray-curable/electron ray-curable hard coat agent having the same composition as used in Example 5 was applied onto the light-transmitting layer (18) by spin coating, and then the resultant was heated at 60° C. in the atmosphere for 3 minutes to remove the diluent in the coat. In this way, a hard coat layer (19) which had not been cured was formed.

Next, a solution comprising 0.5% by mass of 2-(perfluorodecyl)ethyl acrylate (manufactured by Daikin Fine Chemical laboratory Co.) and 99.5% by mass of FLUORINERT FC-77 (manufactured by Sumitomo 3M Ltd.) was applied onto the above-mentioned hard coat layer which had not been cured by spin coating. The resultant was dried at 60° C. for 3 minutes to form a surface layer which had not been cured.

Thereafter, under the same electron ray irradiating condition as Example 5, electron rays were irradiated onto the surface layer under nitrogen flow, thereby curing the hard coat layer and the surface layer simultaneously. The thickness of the cured hard coat layer was 2.5 μm, and the thickness of the cured surface layer was about 28 nm. In this way, the optical recording disk sample No.2 with the composite hard coat layer was obtained.

Comparative Example 4

In the same way as in Example 5, a reflecting layer (13), a second dielectric layer (14), a phase-change recording material layer (15), and a light-transmitting layer (18) were formed, in the order, on a surface of a disk-form supporting substrate (12).

5 parts by weight of 2-(perfluorooctyl)ethyl acrylate (manufactured by Daikin Fine Chemical laboratory Co.) was added to 95 parts by weight of ultraviolet ray-curable/electron ray-curable hard coat agent having the same composition as used in Example 5 so as to prepare the uniform composition. This composition was applied onto the light-transmitting layer (18) by spin coating. Thereafter, electron rays were immediately irradiated under nitrogen flow to cure the applied composition. Electron ray irradiating condition was the same as Example 5. The thickness of the cured hard coat layer was 2.5 μm. In this way, the optical recording disk sample No.3 with the single hard coat layer was obtained.

(Evaluation)

As with the substrates with respective hard coat layers, each of the optical recording disk samples Nos. 1 to 3 of Example 5 and Comparative Examples 3 and 4 was evaluated for (1) abrasion resistance, (2) water repellency and persistence thereof, and (3) surface smoothness on its hard coat surface. The optical recording disk sample No. 1 of Example 5 showed the results comparable to the substrate with the hard coat layer of Example 2: the sample produced good results for each of the measured properties. The optical recording disk sample No. 2 of Comparative Example 3 showed the results comparable to the substrate with the hard coat layer of Comparative Example 1. Similarly, the optical recording disk sample No. 3 of Comparative Example 4 showed the results comparable to the substrate with the hard coat layer of Comparative Example 2.

In the above-mentioned example, the composite hard coat layer was given to the phase-change type optical disks. However, the present invention can be applied to read-only type optical disks or write-once type optical disks as well as optical-disks having a phase-change type recording layer. The present invention can also be applied to not only optical information media but also optical lens, optical filters, anti-reflection films, and various display elements. Therefore, the above-mentioned working examples are merely examples in all points, and the present invention should not be restrictedly interpreted by the examples. Furthermore, all modifications belonging to a scope equivalent to that of the claims are within the scope of the present invention.

INDUSTRIAL APPLICABILITY

According to the present invention, an article with a hard coat, which has high abrasion resistance, good water repellency and lubricity, and significantly high durability, is inexpensively and easily provided.

The invention claimed is:

1. An article with a composite hard coat layer comprising a hard coat layer on a surface of the article and an anti-staining surface layer on a surface of the hard coat layer, wherein
    the hard coat layer is made of a cured product of a hard coat agent composition comprising an active energy ray-curable compound having at least one reactive (meth)acryloyl group;
    the anti-staining surface layer is made of a cured product of a surface material comprising a fluorine-containing polyfunctional (meth)acrylate compound, where the surface material does not comprise any fluorine-containing monofunctional (meth)acrylate compounds;
    the composite hard coat layer is produced by a process comprising simultaneously irradiating with active energy rays the hard coat agent composition and the surface material while the hard coat agent composition is in direct contact with the surface material; and
    the article is an optical recording medium.

2. The article with the composite hard coat layer according to claim 1, wherein the hard coat agent composition comprises a photopolymerization initiator, and, optionally, an inorganic filler.

3. An article with a composite hard coat layer comprising a hard coat layer on a surface of the article and an anti-staining surface layer on a surface of the hard coat layer, wherein the article is obtained by
    applying a hard coat agent composition comprising an active energy ray-curable compound, which has at least one reactive (meth)acryloyl group, onto a surface of an article to be hard-coat-treated, thereby forming a hard coat agent composition layer;
    film-forming, directly on a surface of the hard coat agent composition layer, with a surface material comprising a fluorine-containing polyfunctional (meth)acrylate compound, where the surface material does not comprise any fluorine-containing monofunctional (meth)acrylate compounds, thereby forming a surface material layer; and
    irradiating active energy rays onto the formed hard coat agent composition layer and surface material layer so as to cure the both layers simultaneously, thereby forming a hard coat layer contacting the surface of the article and an anti-staining surface layer contacting the surface of the hard coat layer, and wherein
    the article is an optical recording medium.

4. A method for forming a composite hard coat layer comprising a hard coat layer and an anti-staining surface layer on a surface of an article, the method comprising the steps of:
    applying a hard coat agent composition comprising an active energy ray-curable compound, which has at least one reactive (meth)acryloyl group, onto a surface of an article to be hard-coat-treated, thereby forming a hard coat agent composition layer;
    film-forming, directly on a surface of the hard coat agent composition layer, with a surface material comprising a fluorine-containing polyfunctional (meth)acrylate compound, where the surface material does not comprise any fluorine-containing monofunctional (meth)acrylate compounds, thereby forming a surface material layer;
    irradiating active energy rays onto the formed hard coat agent composition layer and surface material layer so as to cure the both layers simultaneously, thereby forming a hard coat layer contacting the surface of the article and an anti-staining surface layer contacting the surface of the hard coat layer; and
    producing the article with a composite hard coat layer of claim 1, wherein
    the article is an optical recording medium.

5. The method for forming the composite hard coat layer according to claim 4, wherein after the hard coat agent composition is applied onto the surface of the article, the hard coat agent composition layer is dried to remove a solvent contained in the hard coat agent composition from the hard coat agent composition layer, and then the surface material layer is formed.

6. The method for forming the composite hard coat layer according to claim 4, wherein after the hard coat agent composition is applied onto the surface of the article, the hard coat agent composition layer is optionally dried, active energy rays are irradiated onto the hard coat agent composition layer to turn the composition layer into a half-cured state, and then the surface material layer is formed.

7. The method for forming the composite hard coat layer according to claim 4, wherein at the time of film-forming by applying the surface material to form surface material layer, there is used, as a solvent, a solvent in which the active energy ray-curable compound in the already-formed hard coat agent composition layer is not substantially dissolved.

* * * * *